(12) United States Patent
Heibel et al.

(10) Patent No.: US 12,366,673 B2
(45) Date of Patent: Jul. 22, 2025

(54) DEVICE FOR MEASURING THE ACTIVITY OF NUCLEAR ISOTOPES USING A SELF-POWER DETECTOR

(71) Applicant: Westinghouse Electric Company LLC, Cranberry Township, PA (US)

(72) Inventors: Michael D. Heibel, Broomfield, CO (US); Michael C. Prible, Cranberry Township, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 354 days.

(21) Appl. No.: 17/995,387

(22) PCT Filed: Mar. 26, 2021

(86) PCT No.: PCT/US2021/024410
§ 371 (c)(1),
(2) Date: Oct. 3, 2022

(87) PCT Pub. No.: WO2021/202287
PCT Pub. Date: Oct. 7, 2021

(65) Prior Publication Data
US 2023/0152477 A1    May 18, 2023

Related U.S. Application Data

(60) Provisional application No. 63/003,610, filed on Apr. 1, 2020.

(51) Int. Cl.
*G01T 3/00* (2006.01)
(52) U.S. Cl.
CPC .................................. *G01T 3/006* (2013.01)

(58) Field of Classification Search
None
See application file for complete search history.

(56) References Cited

U.S. PATENT DOCUMENTS 5,251,242 A * 10/1993 Impink, Jr. ............. G01T 3/006
376/245
2013/0083879 A1   4/2013 Heibel et al.

FOREIGN PATENT DOCUMENTS

JP      351014088 A    2/1976
WO    2021202287 A2   10/2021

OTHER PUBLICATIONS

International Search Report and Written Opinion for International PCT Application No. PCT/US2021/024410, dated Oct. 26, 2021.
(Continued)

*Primary Examiner* — Edwin C Gunberg
(74) *Attorney, Agent, or Firm* — K&L Gates LLP (57) ABSTRACT

A measuring device for measuring the activity of a specimen of a radioactive isotope is disclosed. The specimen of the radioactive isotope is contained within a capsule. The measuring device comprises an inner enclosure, a gamma-radiation sensitive self-power detector (SPD) positioned around the inner enclosure, and an outer enclosure positioned around the SPD and the inner enclosure. The inner enclosure comprises an internal cavity configured to receive the capsule containing the specimen. The inner enclosure defines a longitudinal axis. The outer enclosure secures the SPD to the inner enclosure such that the SPD does not move during operation and storage of the measuring device.

22 Claims, 2 Drawing Sheets

(56) References Cited

OTHER PUBLICATIONS

Strindehag, Self-Powered Neutron and Gamma Detectors for In-Core Measurements, https://www.osti.gov/etdeweb/servlets/purl/922444 (Jan. 1, 2971), pp. 1-20.

* cited by examiner

DEVICE FOR MEASURING THE ACTIVITY OF NUCLEAR ISOTOPES USING A SELF-POWER DETECTOR

CROSS-REFERENCE TO RELATED APPLICATIONS

This application is a U.S. National Stage Entry under 35 U.S.C. § 371 of International Patent Application No. PCT/US2021/024410, entitled DEVICE FOR MEASURING THE ACTIVITY OF NUCLEAR ISOTOPES USING A SELF-POWER DETECTOR, filed Mar. 26, 2021, which claims benefit under 35 U.S.C. § 119 (e) to U.S. Provisional Application Ser. No. 63/003,610 filed Apr. 1, 2020, the entire disclosures of which are hereby incorporated by reference herein.

BACKGROUND

An accurate measurement of the amount of gamma radiation emitted from a volume of a radioactive isotope in a sample, such as Cobalt-60 (Co-60), is required to ensure the total activity level of the radioactive isotope in the sample meets a desired total activity level. The total activity of the sample is the number of decays per unit time and volume of a radioactive isotope. The radioactive isotope sample, or specimen, may be contained within a capsule, tube, and/or enclosure, Measuring the activity of the specimen is required to ensure the activity of the specimen meets the licensed activity limits of the cask used to ship the specimen to its final destination and to ensure the activity of the specimen meets the commercial supplier requirements. Radioactive isotopes, such as Co-60, are used commercially in the medical industry for irradiating cancerous tumors, for the sterilization of medical equipment, and to sterilize food, among other things. A quick and accurate means of performing the activity measurement of a specimen is required to minimize the uncertainty and labor costs associated with the aforementioned tasks.

SUMMARY

In various embodiments, a measuring device for measuring the activity of a specimen of a radioactive isotope is disclosed. The specimen of the radioactive isotope is contained within a capsule. The measuring device comprises an inner enclosure, a gamma-radiation sensitive self-power detector (SPD) positioned around the inner enclosure, and an outer enclosure positioned around the SPD and the inner enclosure. The inner enclosure comprises an internal cavity configured to receive the capsule containing the specimen. The inner enclosure defines a longitudinal axis. The outer enclosure secures the SPD to the inner enclosure such that the SPD does not move during operation and storage of the measuring device.

In various embodiments, a method of measuring the activity of a target specimen comprising a radioactive isotope is disclosed. The method comprises the step of positioning a plurality of test specimens of a radioactive isotope within a measuring device comprising a gamma-sensitive self-power detector (SPD) one at a time, wherein the activity of each of the test specimens is known. The method further comprises the steps of measuring electrical current within the SPD when each of the test specimens is positioned in the measuring device and positioning a target specimen of the same radioactive isotope as the test specimens within the measuring device, wherein the activity of the target specimen is unknown. The method further comprises the steps of measuring electrical current within the SPD when the target specimen is positioned in the measuring device and comparing the measured electrical currents of the test specimens to the measured electrical current of the target specimen to determine the activity of the target specimen.

In various embodiments, a method of measuring the activity of a target specimen comprising a radioactive isotope is disclosed. The method comprises the step of positioning a target specimen of a radioactive isotope within a measuring device comprising a gamma-sensitive self-power detector (SPD), wherein the activity of the target specimen is unknown, and wherein the SPD comprises a known sensitivity level and a known length. The method further comprises the steps of measuring electrical current of the SPD when the target specimen is positioned in the measuring device and determining the activity of the target specimen using the measured electrical current of the SPD, the known sensitivity level of the SPD, and the known length of the SPD.

BRIEF DESCRIPTION OF THE DRAWINGS

Various features of the embodiments described herein, together with advantages thereof, may be understood in accordance with the following description taken in conjunction with the accompanying drawings as follows.

DETAILED DESCRIPTION

Figure 1:
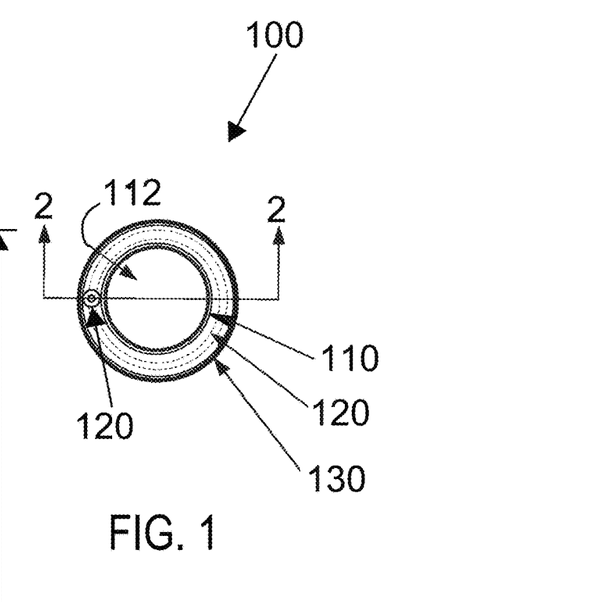
FIG. 1 is a plan view of a measurement device for measuring the activity of a specimen of a radioactive isotope in accordance with at least one aspect of the present disclosure.
Figure 2:
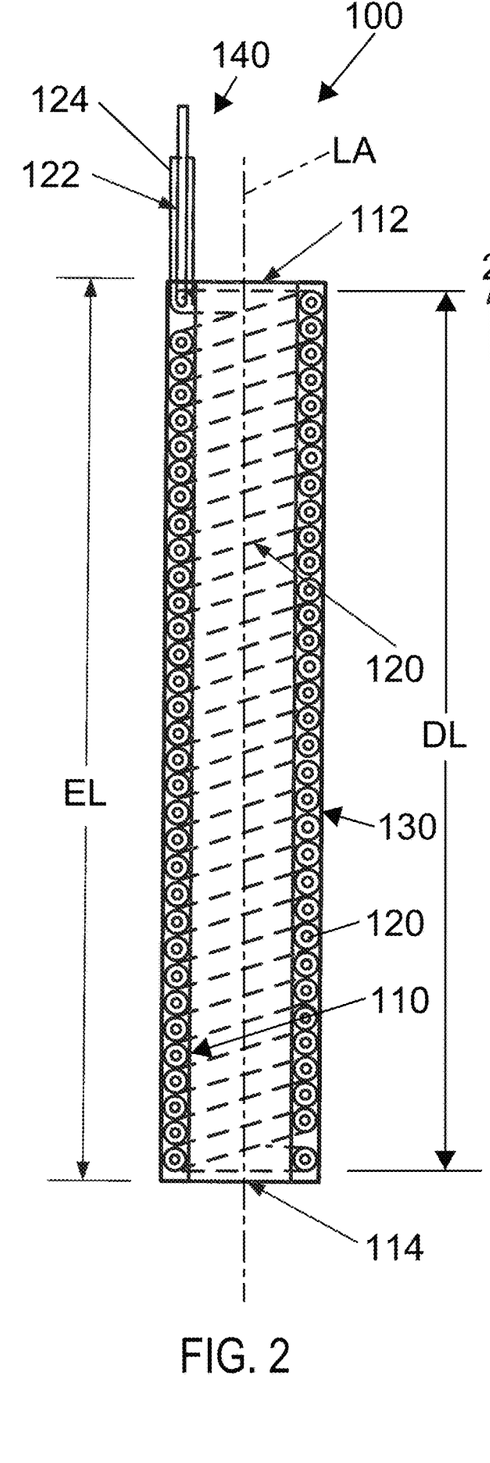
FIG. 2 is cross sectional view of the measurement device of FIG. 1 taken through line 2-2 in FIG. 1.

FIGS. 1 and 2 illustrate a measuring device 100 for measuring the activity of a specimen of a radioactive isotope. The specimen can be contained within a tube, enclosure, or capsule. In at least one embodiment, the radioactive isotope of the specimen comprises Co-60. However, other embodiments are envisioned with different specimens with different radioactive isotopes such as Molybdenum-99, Iodine 131, and other beta-particle emitters useful in nuclear medicine applications. In any event, the measuring device 100 comprises an inner enclosure or inner tube 110, a self-power detector 120 (SPD) positioned around the inner tube 110, and an outer enclosure or outer tube 130 positioned around the SPD 120 and the inner tube 110. In at least one embodiment, the inner tube 110 and the outer tube 130 are attached to one another with the SPD 120 positioned intermediate the inner tube 110 and the outer tube 130. The inner tube 110 may be attached to the outer tube 130 via welding, bolting, fastening, and/or any other suitable attachment method. In any event, the inner tube 110 comprises an opening, or cavity 112, that is configured to receive the capsule containing the specimen. The outer tube 130 is positioned around the SPD 120 and the inner tube such that the SPD 120 is held and/or secured to the inner tube 110 so that that the SPD does not change positions during operation and/or storage. The position of the SPD relative to the specimen is important to ensure an accurate measurement of the Activity level. If the SPD shifts relative to the outer tube 130, the specimen may not be properly aligned with the SPD and the accuracy of the Activity measurement may be affected.

Further to the above, the inner tube 110 comprises an inner diameter and an outer diameter. The inner diameter of the inner tube 110 defines the cavity 112 of the inner tube 110. In at least one embodiment, the inner diameter of the inner tube 110 is 0.24 inch-0.45 inch, for example. The outer tube 130 comprises an inner diameter and an outer diameter. The inner diameter of the outer tube 130 is configured to receive the SPD and the inner tube 110. In at least one embodiment, the inner diameter of the outer tube 130 is determined based on the outer diameter of the inner tube and the outer diameter of the SPD 120, for example. In the illustrated embodiment the inner tube 110 and the outer tube 130 are the same length EL. However, other embodiments are envisioned where the inner tube 110 and the outer tube 130 are different lengths. In at least one embodiment, length EL for the inner tube 110 and the outer tube 130 is 7 inch-10 inch, for example. In any event, the inner tube 110 and the outer tube 130 are concentric and define a longitudinal axis LA, The capsule containing the specimen is inserted into the cavity 112 of the inner tube 110 along the longitudinal axis LA through an opening at one end of the measuring device 100. One end of the inner tube 110 and the outer tube 130 is open so that the specimen can be loaded into the cavity 112 and the other end 114 of the inner tube 110 and the outer tube 130 is closed to prevent the specimen from falling out of the cavity 112. However, other embodiments are envisioned with a lid on the open end of the measuring device 100. Further still, other embodiments are envisioned with both ends of the measuring device 100 open, in such an arrangement, the measuring device 100 comprises internal features within the cavity 112 to secure and/or hold the capsule containing the specimen.

Further to the above, in the illustrated embodiment the inner enclosure or inner tube 110 and the outer enclosure or outer tube 130 are tubular in shape. However, other embodiments are envisioned where the inner enclosure and the outer enclosure are rectangular or square in cross-section, however, any suitable enclosure(s) can be used to receive the specimen and position the SPD around the specimen.

In the nuclear industry, SPDs are configured to measure the amount of activity of a radioactive isotope based on an electrical current induced within the SPD by the radioactive isotope. SPDs are designed to generate an electrical current when the SPD is exposed to radiation, such as gamma-radiation. The electrical current of an SPD exposed to radiation can be measured in a number of ways. Further, SPDs typically come in a wire configuration with an inner core and an outer sheath and manufacturers of SPDs are able to calculate, via testing, a sensitivity value of the SPD. The sensitivity value of an SPD is based on the amount of electrical current that will be generated within a given length of the SPD for a given amount and type of radiation exposure. As discussed above, the position of the SPD relative to the specimen should remain constant throughout the life of the measuring device 100 to ensure an accurate activity level measurement.

Further to the above, the SPD 120 comprises a gamma-radiation sensitive SPD, however, other embodiments are envisioned wherein the SPD 120 is sensitive to different types of radiation other than gamma radiation. In any event, the SPD 120 illustrated in FIGS. 1 and 2 comprises a wire including an inner core 122 and an outer sheath 124 surrounding the inner core 122. In at least one embodiment, the inner core 122 comprises Platinum and the outer sheath 124 comprises a metallic material that is an electrical conductor comprising material or materials with lower atomic number(s) than Platinum. In at least one embodiment, the outer sheath 124 can comprise an iron-based material such as stainless steel, Inconel, and/or any other suitable material. In at least one embodiment, the SPD 120 comprises a platinum emitter, which does not deplete when the measurements are made outside the reactor, thus ensuring that the operating characteristics of the SPD 120 will not change significantly with time. The measuring device 100 can be used to measure the activity of multiple radioisotopes by developing radioisotope specific calibration constants.

Further to the above, in the illustrated embodiment the SPD 120 is wrapped around the outer diameter of the inner tube 110 in a helix configuration. More specifically, the SPD 120 is wrapped around the inner tube 110 about the longitudinal axis LA of the inner tube 110 such that the SPD 120 covers the outer diameter of the inner tube 110 along length DL of the inner tube 110. In at least one embodiment, the length of the capsule and/or test specimen is the same as length DL. The capsule and/or test specimen is positioned along the longitudinal axis LA such that the capsule and/or test specimen is positioned within length DL. In other words, the position of the capsule and/or test specimen along the longitudinal axis overlaps with where the SPD 120 is wrapped around the inner tube 110, In any event, the SPD 120 is tightly wrapped around the outer surface of the inner tube 110 such that there are no gaps, and/or to minimize the gaps, between adjacent pieces of the SPD 120 along length DL. If gaps are present between adjacent pieces of the SPD 120 along length DL, radiation emitted from the specimen may escape without irradiating the SPD 120, thus, preventing and/or reducing these gaps can increase the accuracy of the activity measurement.

Further to the above, when the SPD 120 is exposed to radiation, such as gamma radiation from a radioactive isotope, gamma rays penetrate the outer sheath 124 of the SPD 120 and displace electrons within the inner core 122 which then displace electrons within the outer sheath 124 of the SPD 120 which eventually induces an electrical current in the SPD 120 that can be measured at an electrical output 140. The electrical current induced in the SPD 120 corresponds to the total activity of the radioactive isotope. In at least one instance, the electrical current induced in the SPD 120 is directly proportional to the total activity of the radioactive isotope. Thus, the constant of proportionality between the current output of the SPD 120 and the activity of a specimen of unknown activity (i.e., a target specimen) can be determined via calibration against the current output, measured by the device 100, of a specimen containing a known radioisotope activity (i.e., a test specimen), as discussed in greater detail below.

When an electrical current is induced within the SPD 120, it can be measured at the electrical output 140 with a direct current measuring device on either the inner core 122 and/or the outer sheath 124 of the SPD 120. Further, the voltage difference between the inner core 122 and the outer sheath 124 can be measured and the current can be calculated using Ohms Law (i.e., V=IR) when the resistances are known. In any event, the current within the SPD 120 can be measured and/or calculated for a given target specimen (i.e., where the activity of the target specimen is unknown) and compared to predetermined current measurements of the SPD 120 for radioactive isotopes of known activity (i.e., test specimens). In other words, test specimens with a known activity can be placed into the measuring device 100 and the current produced within the SPD 120 can be measured at the electrical output 140. Thus, current values for the SPD 120 can be generated for a number of radioisotope test specimens of varying known activity which can then be compared to the electrical current produced within the SPD 120 by the target specimen to determine the activity of the target specimen. In at least one embodiment, the radioisotope of the test specimens and the radioisotope of the target specimen(s) are the same type of radioisotope, such as Co-60, for example.

Further to the above, another method for determining the activity of a target specimen within the measuring device 100 comprises using the sensitivity level of the SPD 120 of the measuring device 100. More specifically, the length of the SPD 120 is known, or can be calculated, and the sensitivity of the SPD 120 is known (i.e., the sensitivity value from the manufacturer, as discussed above). The length of the SPD 120 is the overall length of the wrapped wire despite its configuration (i.e., not the height or length which the SPD 120 encompasses). Further, as discussed above, the electrical current produced by the SPD 120 when a target specimen (e.g., a radioisotope of unknown activity) is introduced into the measuring device 100 can be measured. Therefore, the activity of the target specimen can be determined through calculation by using the measured electrical current of the SPD, the known sensitivity level of the SPD, and the known length of the SPD. In such an arrangement, test specimens of known activity are unnecessary to determine the activity of the target specimen.

Further to the above, the total activity of the specimen/sample can be measured by at least one of two methods. The first method uses a linear relationship between measured SPD current (I) and sample activity (A) of the form:

$$A = KI$$

K is determined from the measured slope of the linear relationship between measured SPD current and a sample of the desired radioisotope with known total activity such that the slope of the line is determined from at least 2 measured activity values including zero activity and the corresponding measured current with essentially zero background gamma radiation.

The second method for measuring the total activity of the sample inserted into the device with total length L uses measured SPD gamma sensitivity (S) determined by exposing a generic SPD element to one or more known activities of gamma radiation and measuring the output current (I) to produce a relationship where the slope of the relationship (i.e., the sensitivity (S)) has units of (measured current)/(Curie)/(unit length). With this information for a particular SPD design, the measured activity (A) can be determined from the measured current using a relationship such as:

$$A = IL/S$$

The above-described approach allows measurement of sample activity for all SPD elements of a given design without having to individually calibrate each and every device.

Figure 3:
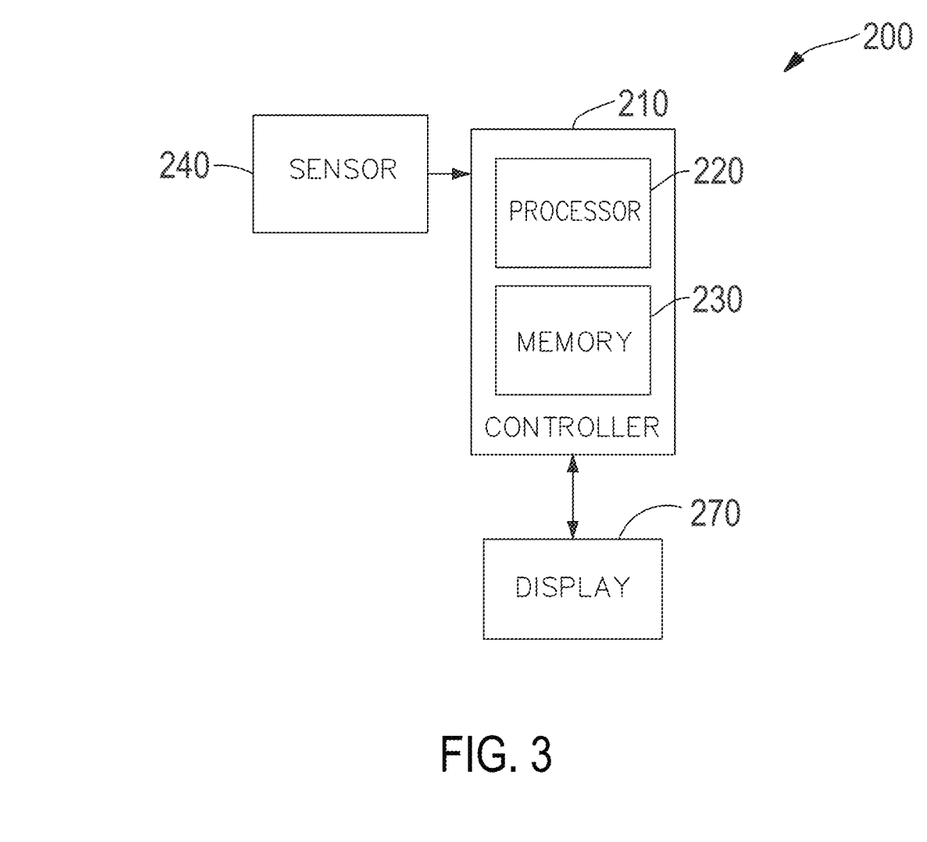
FIG. 3 illustrates a logic diagram of a control system for use with a measuring device, in accordance with at least one aspect of the present disclosure.

FIG. 3 illustrates a logic diagram of a control system 200 for use with a measuring device, such as those described herein, in accordance with one or more aspects of the present disclosure. For example, the control system 200 may be used to calculate the total activity level of a measuring device utilizing the equations discussed herein. The control system 200 comprises a control circuit including a microcontroller 210 comprising a processor 220 and a memory 230. The control system 200 is in signal communication with a sensor 240. The sensor 240 provides real-time feedback to the processor 220. In at least one embodiment, the sensor 240 is a current sensor configured to measure the current within an SPD of a measuring device such as the SPD 120 of the measuring device 100, for example. In at least one embodiment, the sensor 240 is a voltage sensor configured to measure the voltage within an SPD of a measuring device such as the SPD 120 of measuring device 100, for example. In at least one embodiment, the sensor 240 is a resistance sensor configured to measure the resistance of an SPD of a measuring device such as the SPD 120 of measuring device 100, for example. Other embodiments are envisioned where the sensor 240 measures any suitable characteristic of an SPD of a measuring device. The control system 200 comprises a display 270 which displays a variety of conditions or states of the measuring device and may include touch screen functionality for data input. For example, the display 270 can display the total activity level of a specimen of a radioactive isotope after it is calculated by the control system 200.

In one aspect, the microcontroller 210 may be any single-core or multicore processor such as those known under the trade name ARM Cortex by Texas Instruments. In one aspect, the main microcontroller 210 may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle SRAM, and internal ROM loaded with StellarisWare® software, a 2 KB EEPROM, one or more PWM modules, one or more QEI analogs, and/or one or more 12-bit ADCs with 12 analog input channels, details of which are available for the product datasheet.

In one aspect, the microcontroller 210 may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options. The microcontroller 210 may be programmed to perform various functions. For example, the microcontroller 210 may be configured to calculate the total activity level of a radioactive specimen within a measuring device, such as the measuring devices described herein, store the calculated activity level in the memory 230 and then display the calculated activity level on the display 270.

The microcontroller 210 may be configured to compute a response in the software of the microcontroller 210. The computed response is compared to a measured response of the actual system to obtain an "observed" response, which is used for actual feedback decisions. The observed response is a favorable, tuned value that balances the smooth, continuous nature of the simulated response with the measured response, which can detect outside influences on the system.

In one aspect, a power assembly provides power to the control system 200. The power assembly may comprise a battery which may include a number of battery cells connected in series that can be used as the power source to power the control system 200. In certain circumstances, the battery cells of the power assembly may be replaceable and/or rechargeable. In at least one example, the battery cells can be lithium-ion batteries which can be couplable to and separable from the power assembly. However, other embodiments are envisioned where the control system 200 is powered by the electrical current produced by an SPD of a measuring device, such as SPD 120 of measuring device 100, for example.

Further to the above, the control system 200 may be provided on any of the measuring devices described herein. However, other embodiments are envisioned where the control system 200 is separate from the measuring device and in signal communication with the measuring device via wired or wireless connections.

Various aspects of the subject matter described herein are set out in the following examples.

Example 1—A measuring device for measuring the activity of a specimen of a radioactive isotope, wherein the specimen of the radioactive isotope is contained within a capsule. The measuring device comprises an inner enclosure, a gamma-radiation sensitive self-power detector (SPD) positioned around the inner enclosure, and an outer enclosure positioned around the SPD and the inner enclosure. The inner enclosure comprises an internal cavity configured to receive the capsule containing the specimen. The inner enclosure defines a longitudinal axis. The outer enclosure secures the SPD to the inner enclosure such that the SPD does not move during operation and storage of the measuring device.

Example 2—The measuring device of Example 1, wherein the radioactive isotope is Co-60.

Example 3—The measuring device of Examples 1 or 2, wherein at least a portion of the SPD comprises platinum.

Example 4—The measuring device of Examples 1, 2, or 3, wherein the inner enclosure defines a first length along the longitudinal axis, wherein the specimen defines a second length along the longitudinal axis, and wherein the first length and the second length are the same.

Example 5—The measuring device of Example 4, wherein the specimen is positioned relative to the inner enclosure such that the first length and the second length overlap along the longitudinal axis.

Example 6—The measuring device of Examples 4 or 5, wherein the inner enclosure comprises an outer surface, and wherein the SPD is positioned around the outer surface of the inner enclosure such that the entirety of the outer surface is covered by the SPD.

Example 7—The measuring device of Examples 1, 2, 3, 4, 5, or 6, wherein the inner enclosure comprises an outer surface, and wherein the SPD is wrapped around the outer surface of the inner enclosure in a spiral configuration.

Example 8—The measuring device of Example 7, wherein the spiral configuration of the SPD is configured to cover the entirety of the outer surface of the inner enclosure.

Example 9—The measuring device of Examples 1, 2, 3, 4, 5, 6, 7, or 8, wherein the inner enclosure comprises an outer surface, and wherein the SPD is wrapped around the outer surface of the inner enclosure in a helix configuration.

Example 10—The measuring device of Example 9, wherein the helix configuration of the SPD is configured to cover the entirety of the outer surface of the inner enclosure.

Example 11—The measuring device of Examples 1, 2, 3, 4, 5, 6, 7, 8, 9, or 10, wherein the specimen comprises a specimen length defined along the longitudinal axis, wherein the inner enclosure comprises an outer surface, and wherein the SPD is wrapped around the inner enclosure such that the SPD covers the entirety of the outer surface along the specimen length.

Example 12—A method of measuring the activity of a target specimen comprising a radioactive isotope. The method comprises the step of positioning a plurality of test specimens of a radioactive isotope within a measuring device comprising a gamma-sensitive self-power detector (SPD) one at a time, wherein the activity of each of the test specimens is known. The method further comprises the steps of measuring electrical current within the SPD when each of the test specimens is positioned in the measuring device and positioning a target specimen of the same radioactive isotope as the test specimens within the measuring device, wherein the activity of the target specimen is unknown. The method further comprises the steps of measuring electrical current within the SPD when the target specimen is positioned in the measuring device and comparing the measured electrical currents of the test specimens to the measured electrical current of the target specimen to determine the activity of the target specimen.

Example 13—The method of Example 12, further comprising the step of using a linear calibration between the measured electrical currents of the test specimens and the measured electrical current of the target specimen.

Example 14—The method of Examples 12 or 13, wherein the radioactive isotope is Co-60.

Example 15—The method of Examples 12, 13, or 14, wherein at least a portion of the SPD comprises platinum.

Example 16—The method of Examples 12, 13, 14, or 15, wherein the SPD is positioned within the measuring device in a helix shape.

Example 17—A method of measuring the activity of a target specimen comprising a radioactive isotope. The method comprises the step of positioning a target specimen of a radioactive isotope within a measuring device comprising a gamma-sensitive self-power detector (SPD), wherein the activity of the target specimen is unknown, and wherein the SPD comprises a known sensitivity level and a known length. The method further comprises the steps of measuring electrical current of the SPD when the target specimen is positioned in the measuring device and determining the activity of the target specimen using the measured electrical current of the SPD, the known sensitivity level of the SPD, and the known length of the SPD.

Example 18—The method of Example 17, wherein the radioactive isotope is Co-60.

Example 19—The method of Examples 17 or 18, wherein at least a portion of the SPD comprises platinum.

Example 20—The method of Examples 17, 18, or 19, the SPD is positioned within the measuring device in a helix configuration.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations, Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

While specific embodiments of the invention have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the invention which is to be given the full breadth of the appended claims and any and all equivalents thereof.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc.," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A measuring device for measuring the activity of a specimen of a radioactive isotope, wherein the specimen of the radioactive isotope is contained within a capsule, and wherein the measuring device comprises:
    an inner enclosure comprising an internal cavity configured to receive the capsule containing the specimen, wherein the inner enclosure defines a longitudinal axis, wherein the inner enclosure comprises a closed end and an open end opposite the closed end, and wherein the internal cavity is positioned between the closed end and the open end;
    a gamma-radiation sensitive self-power detector (SPD) positioned around the inner enclosure; and
    an outer enclosure positioned around the SPD and the inner enclosure, wherein the outer enclosure secures the SPD to the inner enclosure such that the SPD does not move during operation and storage of the measuring device.

2. The measuring device of claim 1, wherein the radioactive isotope is Co-60.

3. The measuring device of claim 1, wherein at least a portion of the SPD comprises platinum.

4. The measuring device of claim 1, wherein the inner enclosure defines a first length along the longitudinal axis, wherein the specimen defines a second length along the longitudinal axis, and wherein the first length and the second length are the same.

5. The measuring device of claim 4, wherein the specimen is positioned relative to the inner enclosure such that the first length and the second length overlap along the longitudinal axis.

6. The measuring device of claim 1, wherein the inner enclosure comprises an outer surface, and wherein the SPD is positioned around the outer surface of the inner enclosure such that the entirety of the outer surface is covered by the SPD.

7. The measuring device of claim 1, wherein the inner enclosure comprises an outer surface, and wherein the SPD is wrapped around the outer surface of the inner enclosure in a spiral configuration.

8. The measuring device of claim 7, wherein the spiral configuration of the SPD is configured to cover the entirety of the outer surface of the inner enclosure.

9. The measuring device of claim 1, wherein the inner enclosure comprises an outer surface, and wherein the SPD is wrapped around the outer surface of the inner enclosure in a helix configuration.

10. The measuring device of claim 9, wherein the helix configuration of the SPD is configured to cover the entirety of the outer surface of the inner enclosure.

11. The measuring device of claim 1, wherein the specimen comprises a specimen length defined along the longitudinal axis, wherein the inner enclosure comprises an outer surface, and wherein the SPD is wrapped around the inner enclosure such that the SPD covers the entirety of the outer surface along the specimen length.

12. A method of measuring the activity of a target specimen comprising a radioactive isotope, wherein the method comprises the steps of:
    positioning a plurality of test specimens of a radioactive isotope within an internal cavity of a measuring device one at a time, the measuring device comprising a gamma-sensitive self-power detector (SPD), wherein the activity of each of the test specimens is known;
    measuring electrical current within the SPD when each of the test specimens is positioned in the measuring device;
    positioning a target specimen of the same radioactive isotope as the test specimens within the internal cavity of the measuring device, wherein the activity of the target specimen is unknown;
    measuring electrical current within the SPD when the target specimen is positioned in the measuring device; and
    comparing the measured electrical currents of the test specimens to the measured electrical current of the target specimen to determine the activity of the target specimen.

13. The method of claim 12, further comprising the step of using a linear calibration between the measured electrical currents of the test specimens and the measured electrical current of the target specimen.

14. The method of claim 12, wherein the radioactive isotope is Co-60.

15. The method of claim 12, wherein at least a portion of the SPD comprises platinum.

16. The method of claim 12, wherein the SPD is positioned within the measuring device in a helix shape.

17. The method of claim 12, wherein the measuring device comprises an enclosure including an open end and a closed end opposite the open end, and wherein the internal cavity is defined between the open end the closed end.

18. The method of claim 12, wherein the step of measuring electrical current within the SPD when the target specimen is positioned in the measuring device occurs outside of a reactor.

19. A method of measuring the activity of a target specimen comprising a radioactive isotope, wherein the method comprises the steps of:

positioning a target specimen of a radioactive isotope within a measuring device comprising a gamma-sensitive self-power detector (SPD), wherein the activity of the target specimen is unknown, and wherein the SPD comprises a known sensitivity level and a known length;

measuring electrical current of the SPD when the target specimen is positioned in the measuring device; and determining the activity of the target specimen using the measured electrical current of the SPD, the known sensitivity level of the SPD, and the known length of the SPD.

20. The method of claim 19, wherein the radioactive isotope is Co-60.

21. The method of claim 19, wherein at least a portion of the SPD comprises platinum.

22. The method of claim 19, the SPD is positioned within the measuring device in a helix configuration.

\* \* \* \* \*